United States Patent
Foos et al.

(10) Patent No.: US 8,978,803 B2
(45) Date of Patent: Mar. 17, 2015

(54) DIVIDED DUAL INLET HOUSING FOR AN AIR-BASED HYBRID BATTERY THERMAL CONDITIONING SYSTEM

(75) Inventors: Michael S. Foos, Clarkston, MI (US); Ronald A. Swartz, Waterford, MI (US); Brooksie J. Pollack, Ortonville, MI (US); Teresa A Walczyk, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 13/493,101

(22) Filed: Jun. 11, 2012

(65) Prior Publication Data
US 2013/0327581 A1    Dec. 12, 2013

(51) Int. Cl.
*B60K 1/04* (2006.01)
*B60H 1/00* (2006.01)
*B60K 11/06* (2006.01)

(52) U.S. Cl.
CPC ............ *B60H 1/00278* (2013.01); *B60K 11/06* (2013.01)
USPC ........................................ 180/68.5; 180/68.1

(58) Field of Classification Search
CPC .......... B60K 1/04; B60K 11/06; B60K 11/08; B60K 13/02; B60H 1/00278
USPC ................... 180/68.1, 68.2, 68.5; 165/41, 42; 454/103, 104, 141, 142; 285/131.1, 285/133.6, 125.1, 424
See application file for complete search history.

(56) References Cited

U.S. PATENT DOCUMENTS

| | | | | |
|---|---|---|---|---|
| 139,550 | A | * | 6/1873 | Cronin .......................... 239/722 |
| 862,649 | A | * | 8/1907 | Mower ....................... 285/125.1 |
| 1,104,816 | A | * | 7/1914 | Miller et al. .................. 454/104 |
| 4,323,113 | A | * | 4/1982 | Troyer ............................ 165/45 |
| 4,427,056 | A | | 1/1984 | Johnson et al. |
| 4,453,591 | A | | 6/1984 | Fehr |
| 4,458,583 | A | | 7/1984 | Fukui et al. |
| 4,465,123 | A | | 8/1984 | Sarsten et al. |
| 4,466,480 | A | | 8/1984 | Ito et al. |
| 5,285,863 | A | * | 2/1994 | Miki ............................ 180/68.2 |
| 5,802,862 | A | | 9/1998 | Eiermann |
| 6,070,650 | A | | 6/2000 | Inoue et al. |
| 6,198,174 | B1 | | 3/2001 | Nims et al. |
| 6,290,266 | B1 | * | 9/2001 | Kawano ..................... 285/125.1 |
| 6,761,037 | B2 | | 7/2004 | Tsuboi et al. |
| 6,854,513 | B2 | | 2/2005 | Shirota et al. |
| 7,024,871 | B2 | | 4/2006 | Zhu et al. |
| 7,140,427 | B2 | | 11/2006 | Honda et al. |
| 7,201,219 | B2 | | 4/2007 | Ieda et al. |
| 7,348,741 | B2 | | 3/2008 | Minekawa et al. |
| 7,669,647 | B2 | | 3/2010 | Tsubone et al. |

(Continued)

FOREIGN PATENT DOCUMENTS

CN          1621261 A       6/2005

OTHER PUBLICATIONS

U.S. Appl. No. 12/771,063, filed Apr. 30, 2010, entitled "Air-Based Hybrid Battery Thermal Conditioning System", Michael G. Leffert et al, inventors.

*Primary Examiner* — Frank Vanaman

(57) ABSTRACT

A divided dual inlet housing for an air-based hybrid battery thermal conditioning system which is configured such that HVAC air entering at the HVAC air inlet is prevented from partly backflowing out the cabin air inlet via a dividing wall disposed therein so that all the HVAC air exits the divided dual inlet housing at the air outlet.

16 Claims, 8 Drawing Sheets

(56) References Cited

U.S. PATENT DOCUMENTS

| | | |
|---|---|---|
| 2001/0042536 A1 | 11/2001 | Borland |
| 2002/0039672 A1 | 4/2002 | Aramaki |
| 2002/0043413 A1 | 4/2002 | Kimishima et al. |
| 2003/0080714 A1 | 5/2003 | Inoue et al. |
| 2003/0089100 A1 | 5/2003 | Ueno et al. |
| 2005/0029870 A1 | 2/2005 | Aridome |
| 2005/0111167 A1 | 5/2005 | Yamaguchi et al. |
| 2005/0132727 A1 | 6/2005 | Zhu et al. |
| 2005/0167169 A1 | 8/2005 | Gering et al. |
| 2005/0168180 A1 | 8/2005 | Minekawa et al. |
| 2007/0089442 A1 | 4/2007 | Tsuchiya |
| 2008/0028768 A1 | 2/2008 | Goenka |
| 2008/0071437 A1 | 3/2008 | Hirata et al. |
| 2008/0202137 A1 | 8/2008 | Inoue |
| 2009/0015205 A1 | 1/2009 | Katayama |
| 2009/0064695 A1 | 3/2009 | Kojima |
| 2009/0071178 A1 | 3/2009 | Major et al. |
| 2009/0078400 A1 | 3/2009 | Tamura et al. |
| 2009/0126901 A1 | 5/2009 | Hegar et al. |
| 2009/0133415 A1 | 5/2009 | Major et al. |
| 2009/0176150 A1 | 7/2009 | Yanaka |
| 2009/0192663 A1 | 7/2009 | Bennewitz |
| 2009/0195093 A1 | 8/2009 | Bandai et al. |
| 2009/0260905 A1 | 10/2009 | Shinmura |
| 2009/0317694 A1 | 12/2009 | Angquist et al. |
| 2010/0089547 A1 | 4/2010 | King et al. |
| 2010/0241308 A1* | 9/2010 | Kikuchi et al. .......... 701/36 |
| 2011/0269387 A1 | 11/2011 | Leffert et al. |

* cited by examiner

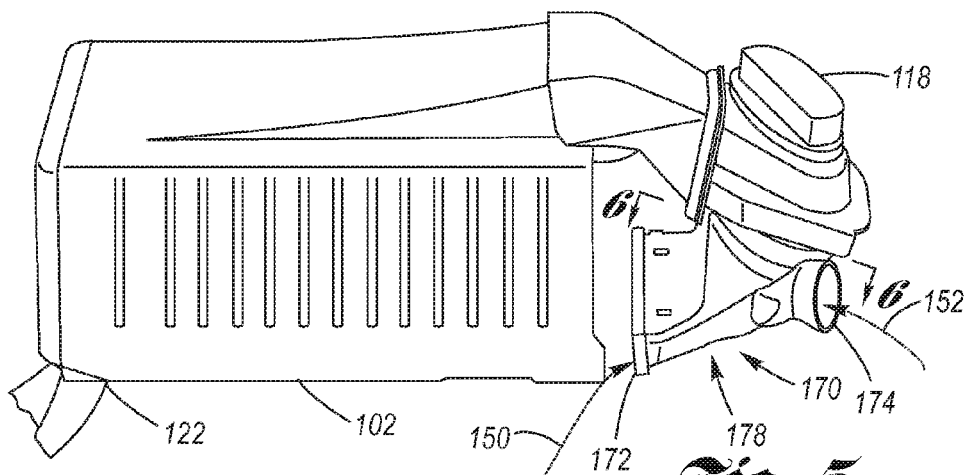
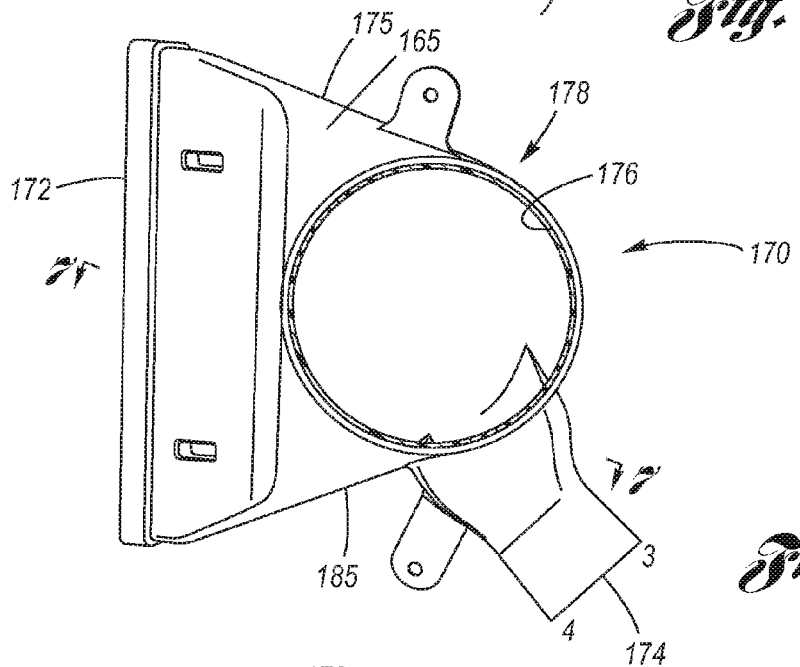
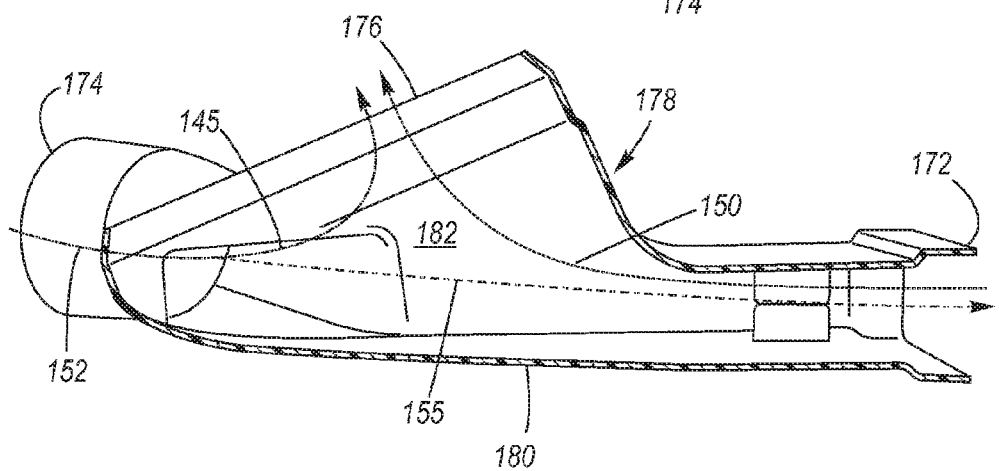

DIVIDED DUAL INLET HOUSING FOR AN AIR-BASED HYBRID BATTERY THERMAL CONDITIONING SYSTEM

TECHNICAL FIELD

The present invention relates to energy storage systems incorporating battery packs utilized in hybrid motor vehicles, and more particularly to the thermal conditioning thereof. Still more particularly, the present invention relates to a divided dual inlet housing of an air-based hybrid battery thermal conditioning system which eliminates backflow air from the HVAC air inlet to the cabin air inlet.

BACKGROUND OF THE INVENTION

Hybrid motor vehicles utilize a propulsion system which incorporates both an internal combustion engine and an electrical system which is used typically for propulsion and regenerative braking. The electrical system includes at least one electrical motor mechanically connected to one or more axles of the motor vehicle and a battery pack of cells which is an integrated component of an energy storage system (ESS) that is electrically connected to the at least one motor. When the at least one motor propels the motor vehicle, electrical energy is extracted from the ESS (the battery pack discharges). During regenerative braking the motor acts as a generator, and the electrical energy generated is delivered to the ESS (the battery pack charges).

FIGS. 1 and 2 schematically depict aspects of a conventional hybrid ESS and the prior art thermal conditioning arrangement therefor.

Within the passenger cabin 10 of the hybrid motor vehicle is disposed the ESS 12, which may, for example, rest on the vehicle floor 14 above the fore-aft floor "tunnel" 16. The ESS 12 is thermally conditioned by the movement of cabin air 50 via an ESS blower 18, whereby the cabin air is circulated through the ESS, originating at at least one permanently open entry vent 20 and exiting at at least one permanently open exit vent 22, both vents being permanently open in the sense of being in permanently and completely open fluidic communication with the passenger cabin. The prior art has sometimes placed the entry vent near the output of the HVAC ducting, whereby cabin air 50 and HVAC air 52 can comingle before unselectively entering the entry vent. Operation of the ESS blower 18 is controlled by a hybrid vehicle integration control module (VICM) 24, utilizing temperature data from (among others) an inlet duct sensor 58, an outlet duct sensor 60, and an ESS temperature sensor 62. The VICM 24 is connected to inputs and outputs by various data lines (see for example dashed lines in FIG. 2). These components 54 are subject to an on-board diagnostics (OBD) requirement, whereby a signal is provided to the driver if a fault is detected in any of the components.

The passenger cabin includes a heating, ventilation and air conditioning (HVAC) module 28, which typically includes passenger input instruments 30 and an HVAC controller 32 which operates the HVAC module in response to the passenger input. Typically, the HVAC module includes an HVAC blower 34, an evaporator 36 for cooling the HVAC air to the cabin and a heater core 38 for heating the HVAC air to the cabin via HVAC ducting 40. These components 56 are not subject to an OBD requirement.

Utilizing the cabin environment in the prior art to provide air for thermal conditioning of the ESS is effective only when the cabin air is not too hot nor too cold. For example, after a soak in hot sun or frigid cold, the ESS will be similarly either hot or cold, and the cabin air used to thermally condition the ESS will also be likewise hot or cold. This has problematic implications for the electrical charge/discharge performance of the ESS, which is temperature dependent. There is an optimal ESS performance temperature range, and the cabin air temperature extremes can easily be outside (both above and below) this range.

This problem of administering ESS thermal conditioning in the prior art is not "solved" by merely placing the entry vent someplace near the outlet of the HVAC ducting, as the commingling of cabin air with HVAC air is haphazard, unselectable and takes too much time.

U.S. patent application Ser. No. 12/771,063, filed on Apr. 30, 2010 entitled "Air-Based Hybrid Battery Thermal Conditioning System", the entirety of the disclosure of which is hereby incorporated herein by reference, describes an ESS thermal conditioning system which selectively utilizes air from at least one auxiliary air source (other than the at least one permanently open entry vent of the prior art), as for example one or more passenger cabin areas, the trunk, an exterior vent, and, most preferably, the HVAC ducting. In this regard, with respect to FIGS. 3 and 4, the ESS 102 and the HVAC module 104 are generally as described with respect to FIGS. 1 and 2, except now an HVAC ESS duct 106 is provided which communicates with the HVAC ducting 108 so that HVAC air 152 can be made selectively available to the ESS blower 118 and be mixed with the cabin air 150, which is always available. The ESS thermal conditioning system performs the function of keeping the ESS temperature within the optimal ESS performance temperature range, or bringing the ESS temperature into this range as quickly as possible.

As mentioned, the passenger cabin includes a heating, ventilation and air conditioning (HVAC) module 104, which typically includes passenger input instruments 130 and an HVAC controller 132 which operates the HVAC module in response to the passenger input. Typically, the HVAC module includes an HVAC blower 134, an evaporator 136 for cooling the HVAC air to the cabin and a heater core 138 for heating the HVAC air to the cabin via the HVAC ducting 108. These components 162 are not subject to an OBD requirement, being not controlled or influenced by the hybrid vehicle integration control module (VICM) 124.

Within the passenger cabin 112 of the hybrid motor vehicle is disposed the ESS 102, which may, for example, rest on the vehicle floor 114 above the fore-aft floor "tunnel" 116. The ESS 102 is thermally conditioned, at least in part, by the movement of cabin air via an ESS blower 118, whereby the cabin air is circulated through the ESS, originating at at least one permanently open entry vent 120 and exiting at at least one permanently open exit vent 122, both vents being permanently open in the sense of being in permanently and completely open fluidic communication with the passenger cabin. Operation of the ESS blower 118 is controlled by the VICM 124, utilizing temperature data from (among others) an inlet duct temperature sensor 154, an outlet duct temperature sensor 156, and an ESS temperature sensor 158. The VICM 124 is connected to inputs and outputs by various data lines (see for example dashed lines in FIG. 3).

The HVAC ESS duct 106 intersects the HVAC ducting 108 of the HVAC module 104 such that the HVAC air may bleed from the HVAC ducting into the HVAC ESS duct. An actuator door, or "bleed" door, 144 is fitted to the HVAC ESS duct 106, and is electrically operated selectively to position anywhere between a closed position to an open position responsive to the VICM 124. The VICM 124 operates the bleed door 144 based upon its programming and data from temperature upstream and downstream sensors 146, 148 disposed on either side of the bleed door, and may for example, utilize other temperature sensors.

The VICM 124, its associated data lines, the system sensors, including inlet and outlet duct temperature sensors 154, 156, and upstream and downstream temperature sensors 146, 148, and any actuator door position sensor (which can be incorporated into the actuator), all constitute an electronic control system 142.

These non-HVAC module components 160 are subject to an on-board diagnostics (OBD) requirement, whereby a signal is provided to the driver if a fault is detected in any of the components.

By way of example, the bleed door 144 may be a panel having an area which matches the cross-sectional area of the HVAC ESS duct 106, and is nonotatably mounted to an axle which is, itself, rotatably mounted to the HVAC ESS duct. The axle is rotated by an actuator which is electrically connected to the VICM 124.

In operation of the air-based hybrid battery thermal conditioning system as described in aforesaid Ser. No. 12/771,063, if the motor vehicle has experienced a cold soak, for example sitting outside on a very cold night, then the driver would be expected to select a heating mode for the HVAC module 128. The VICM 124 would sense the temperature rise of the HVAC air in the HVAC ducting via the temperature sensor 146 and thereupon open the bleed door 144 to allow the ESS blower to duct-in (bleed) a selected portion of the HVAC air 152 from the HVAC ducting to blend or mix with the cabin air 150, wherein the proportion of the HVAC air to cabin air is selected by the VICM and is effected by the selected position of the bleed door (i.e., being positioned more or less open). On the other hand, if the motor vehicle has experienced a hot soak, for example sitting outside on a hot, sunny day, then the driver would be expected to select a cooling mode for the HVAC module. Now, the VICM would sense the temperature decline in the HVAC air via the temperature sensor 146, and thereupon open the bleed door to allow the ESS blower to duct-in (bleed) a selected a portion of the HVAC conditioned air from the HVAC ducting to blend or mix with the cabin air 150, wherein, as mentioned above, the proportion of the HVAC air to cabin air is selected by the VICM and is effected by the selected position of the bleed door (i.e., being positioned more or less open).

What remains needed in the art is a housing for an air-based hybrid battery thermal conditioning system which has an inlet for cabin air, an inlet for HVAC air and an outlet to the blower, wherein the housing prevents the HVAC air entering at the HVAC air inlet from partly backflowing out the cabin air inlet so that all the HVAC air exits the dual inlet housing at the air outlet.

SUMMARY OF THE INVENTION

The present invention is a divided dual inlet housing for an air-based hybrid battery thermal conditioning system which is configured such that HVAC air entering at the HVAC air inlet is prevented from partly backflowing out the cabin air inlet so that all the HVAC air exits the divided dual inlet housing at the air outlet.

The divided dual inlet housing according to the present invention has a cabin air inlet, an HVAC air inlet, and an air outlet, wherein the housing body includes a divider wall, preferably formed of the housing body, which is disposed in the internal air chamber between the cabin air inlet and the HVAC air inlet such that HVAC air entering the HVAC air inlet encounters the dividing wall and thereupon becomes diverted toward the air outlet. The diversion of the HVAC air toward the air outlet by the dividing wall ensures that all the HVAC air exits at the air outlet, none of the HVAC air exiting at the cabin air inlet.

Accordingly, it is an object of the present invention to provide a divided dual inlet housing for an air-based hybrid battery thermal conditioning system which is configured such that HVAC air entering at the HVAC air inlet is prevented from partly backflowing out the cabin air inlet so that all the HVAC air exits the dual inlet housing at the air outlet.

This and additional objects, features and advantages of the present invention will become clearer from the following specification of a preferred embodiment.

BRIEF DESCRIPTION OF THE DRAWINGS

FIG. 5 is an isometric view of components associated with thermal conditioning of a hybrid vehicle ESS, including a dual inlet housing.

FIG. 6 is a view of a dual inlet housing, seen along line 6-6 of FIG. 5.

FIG. 7 is a sectional view of the dual inlet housing, seen along line 7-7 of FIG. 6.

DESCRIPTION OF THE PREFERRED EMBODIMENT

Figure 1:
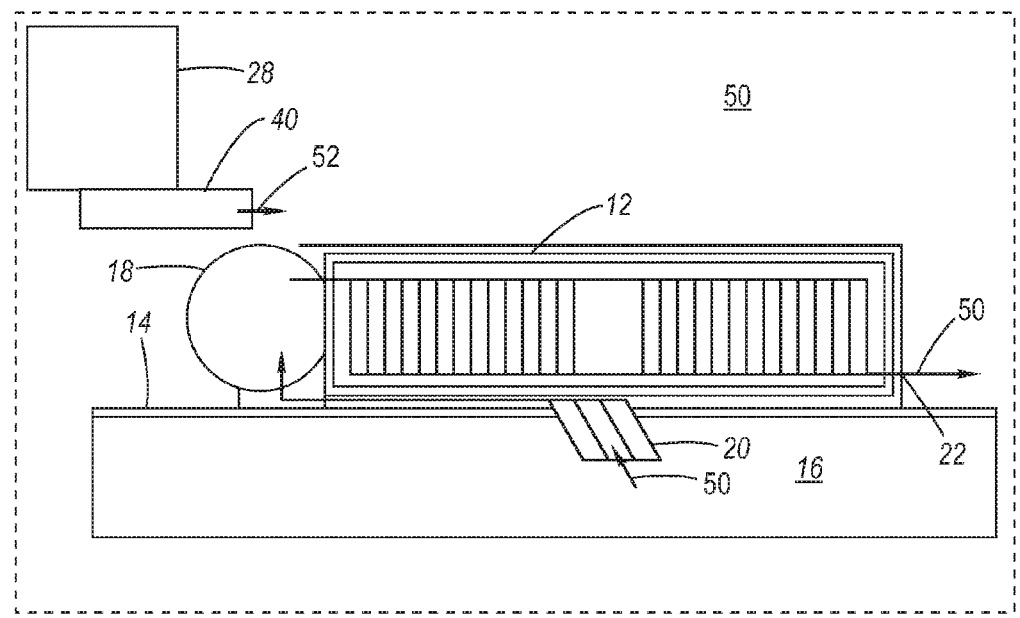
FIG. 1 is a schematic side view of a passenger cabin, showing an HVAC module and components associated with prior art thermal conditioning of a hybrid vehicle ESS.
Figure 2:
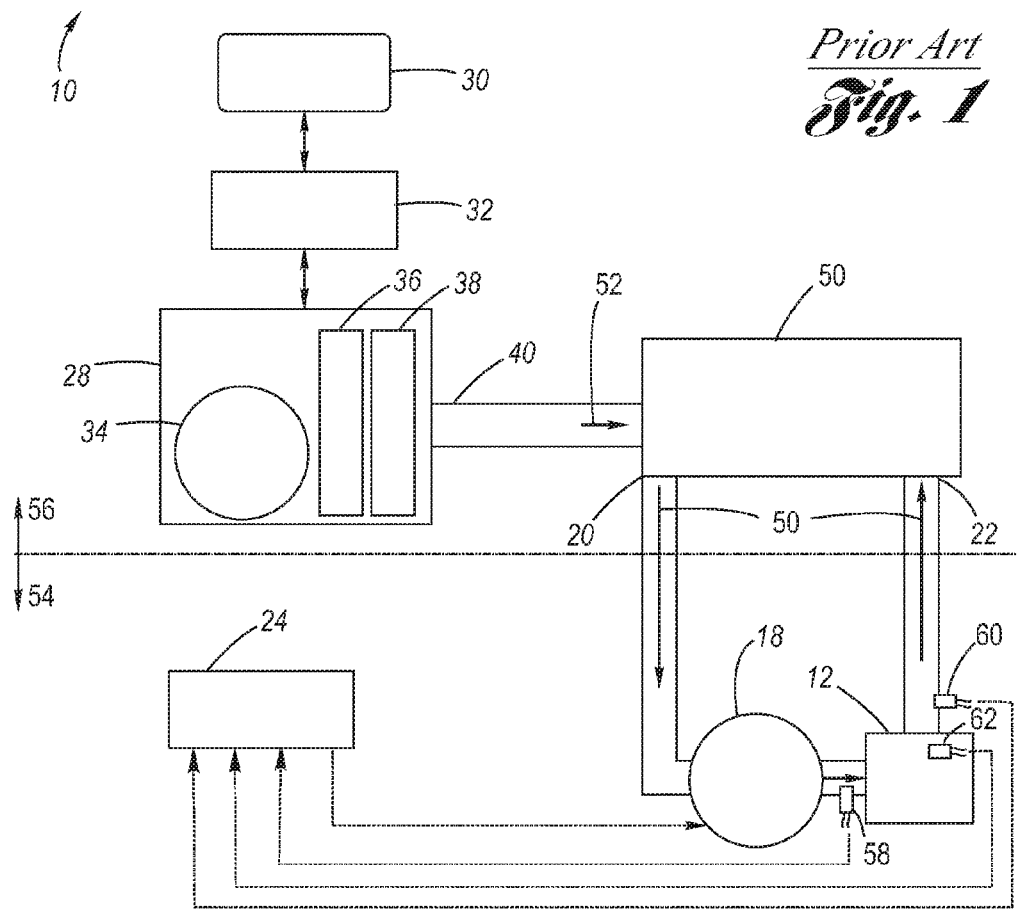
FIG. 2 is a schematic diagram of an HVAC module and components associated with prior art thermal conditioning of a hybrid vehicle ESS.
Figure 3:
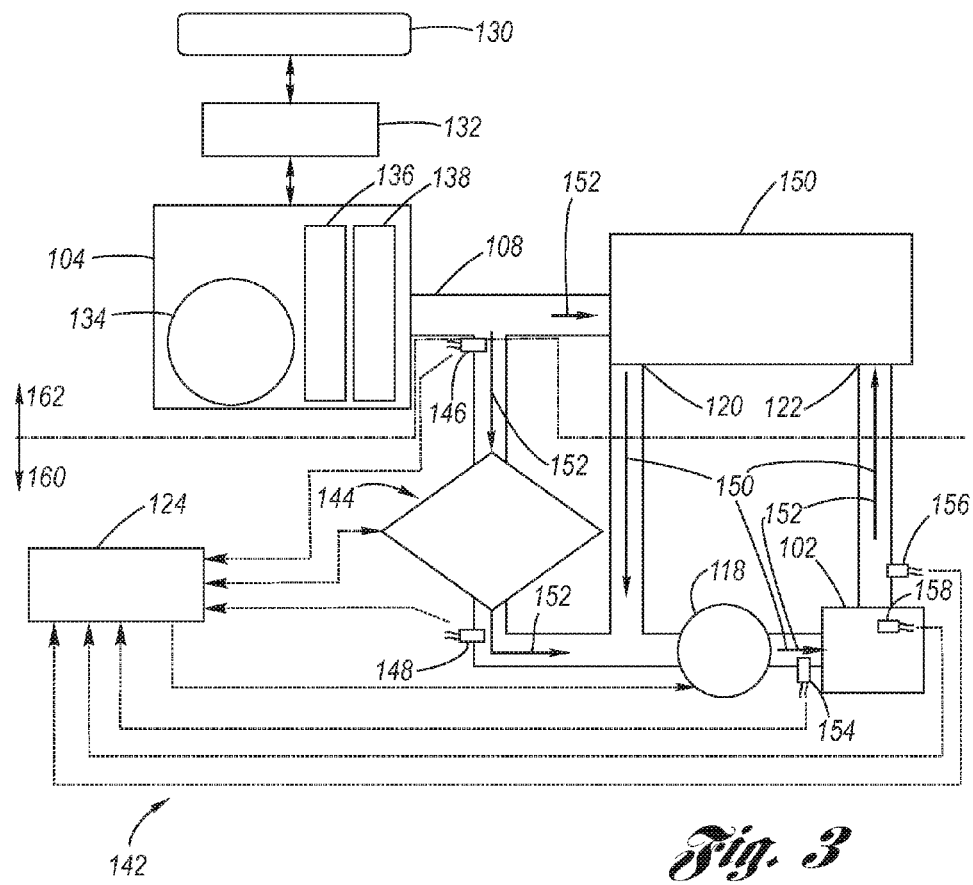
FIG. 3 is a schematic diagram of an HVAC module interfaced selectively with components associated with thermal conditioning of a hybrid vehicle ESS according to U.S. patent application Ser. No. 12/771,063.
Figure 4:
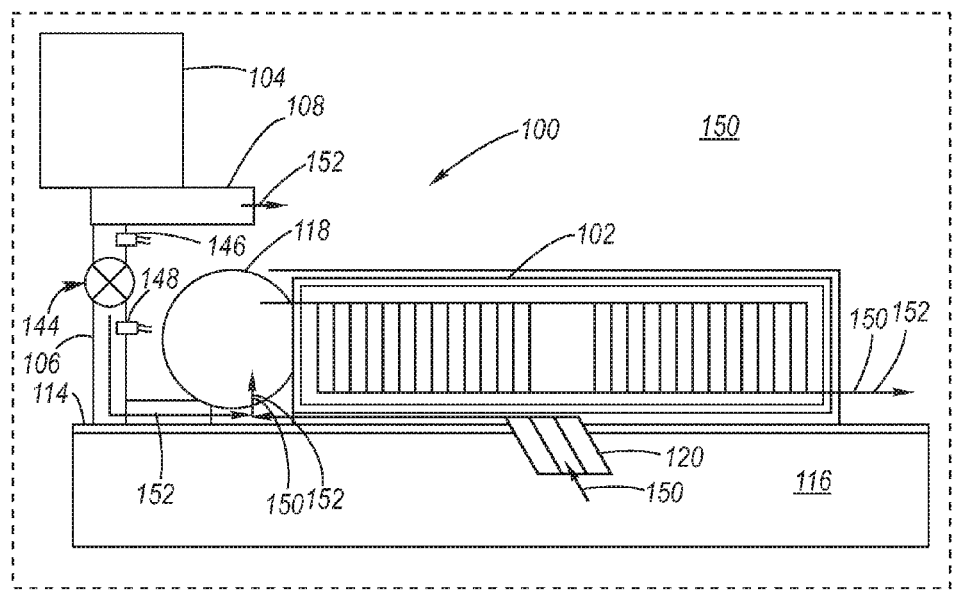
FIG. 4 is a schematic side view of a passenger cabin, showing an HVAC module interfaced with components associated with the thermal conditioning of a hybrid vehicle ESS according to the implementation of FIG. 3.

Referring now to the Drawings, FIGS. 5 through 7 depict various structural and functional aspects of a dual inlet housing adapted for use with the air-based hybrid battery thermal conditioning system 100 as described hereinabove; and FIGS. 8 through 20 depict various structural and functional aspects of the divided dual inlet housing according to the present invention adapted for use with the air-based hybrid battery thermal conditioning system 100 as described hereinabove.

Referring firstly to FIGS. 5 through 7, a dual inlet housing 170 is provided, having a cabin air inlet 172 for inletting cabin air 150, an HVAC air inlet 174 for inletting HVAC air 152, and an air outlet 176 for outletting cabin air 150, HVAC air 152, or a combination thereof to the ESS blower 118. The dual inlet housing 170 is defined by a housing body 178 which includes a lower housing body wall 180 which has a generally straight configuration between the cabin air inlet 170 and the HVAC air inlet 174, whereby the internal air chamber 182 affords an unimpeded air flow of air passing therein from each of the air inlets to the air outlet. The housing body 178 is configured to further include an upper housing body wall 165 whereat is formed the air outlet 176 and left and right housing body sidewalls 175, 185.

It was determined in testing (see Example I), however, that because of the straight configuration of the air flow wall 180 and the freely open configuration of the internal air chamber 182, the HVAC air 172 entering through the HVAC air inlet can backflow out through the cabin air inlet. In this regard, HVAC air backflowing out the cabin air inlet is undesirable in that this backflow of cooled (or heated) air escapes to the passenger compartment and is not directly available to cool (or heat) the ESS. This backflow of the HVAC air is demonstrated at FIG. 7, wherein a first portion 145 of the HVAC air 150 goes out the air outlet 176 to the ESS blower 118, and a second portion 155 backflows out the cabin air inlet 172.

Turning attention next to FIGS. 8 through 12, depicted is a divided dual inlet housing 200 having a first preferred configuration of a dividing wall 210.

Generally similar to FIGS. 5, 6 and 7, the divided dual inlet housing 200 is defined by a housing body 202 which is configured to include a cabin air inlet 204 for inletting cabin air 150, an HVAC air inlet 206 for inletting HVAC air 152, an air outlet 208 for outletting cabin air 150, HVAC air 152, or a combination thereof to the ESS blower 118, and further to include the dividing wall 210. The ESS blower 118 delivers the air coming from the divided dual inlet housing to the ESS 102, whereupon it exits therefrom at an open exit vent 122.

The housing body 202 is configured to further include an upper housing body wall 212 whereat is formed the air outlet 208, a lower housing body wall 214 and left and right housing body sidewalls 216, 218. The lower housing body wall 214 is disposed opposite the air outlet 208. Between the lower housing body wall 214, the air outlet 208 (and partly the upper housing body wall 212) and the left and right housing body sidewalls 216, 218 is an internal air chamber 220. The dividing wall 210 is located in the internal air chamber 220, rising toward the air outlet 208 relative to the lower housing body wall 214 at its generally flat portions 222 disposed adjacent the cabin and HVAC inlets 204, 206 (see FIG. 13). The dividing wall 210 is disposed and configured so as to divide the internal air chamber 220 into a first internal air chamber 215 disposed between the HVAC air inlet 206 and the air outlet 208, and a second internal air chamber 225 disposed between the cabin air inlet 204 and the air outlet. It is preferred for the dividing wall 210 to be formed of the lower housing body wall 214, as for example by injection molding if the material of the housing body 202 is composed of plastic, or for example by stamping, if the housing body is composed of metal; however, the dividing wall may be attached to the lower housing body wall rather than being formed thereof.

Figure 9:
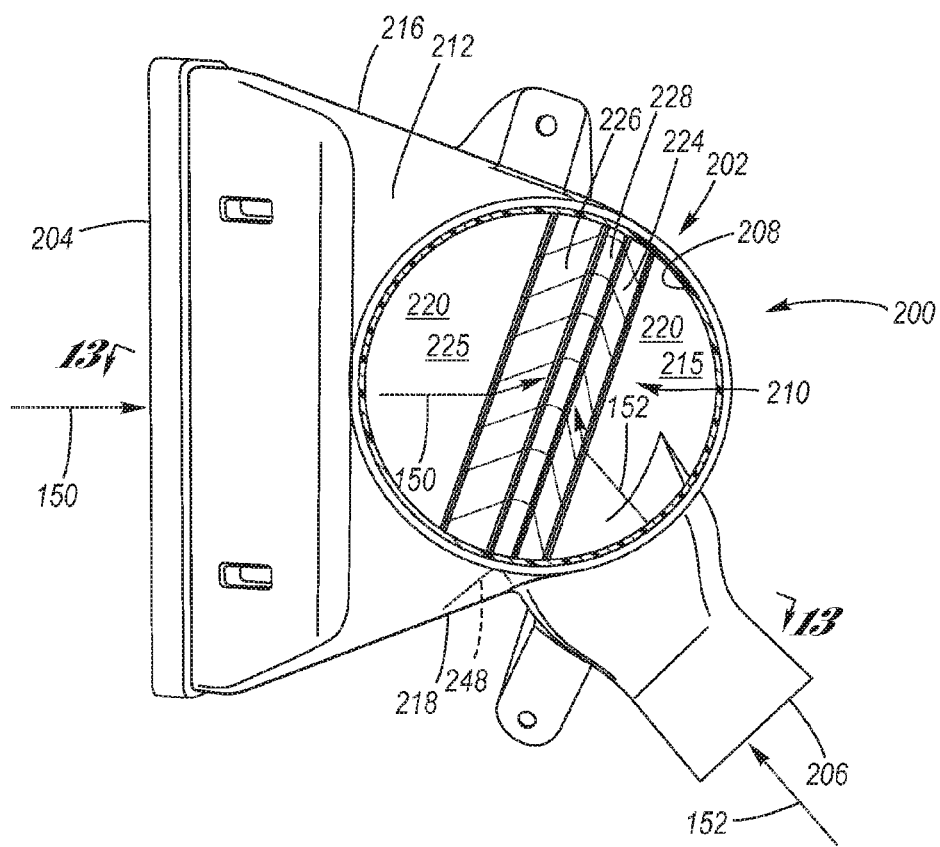
FIG. 9 is a view of the divided dual inlet housing, seen along line 9-9 of FIG. 8.
Figure 10:
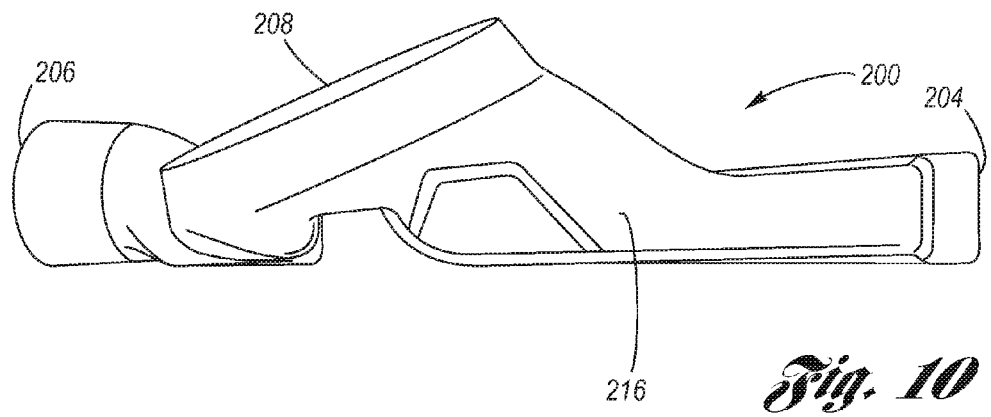
FIG. 10 is a left side elevational view of the divided dual inlet housing according to the present invention.
Figure 11:
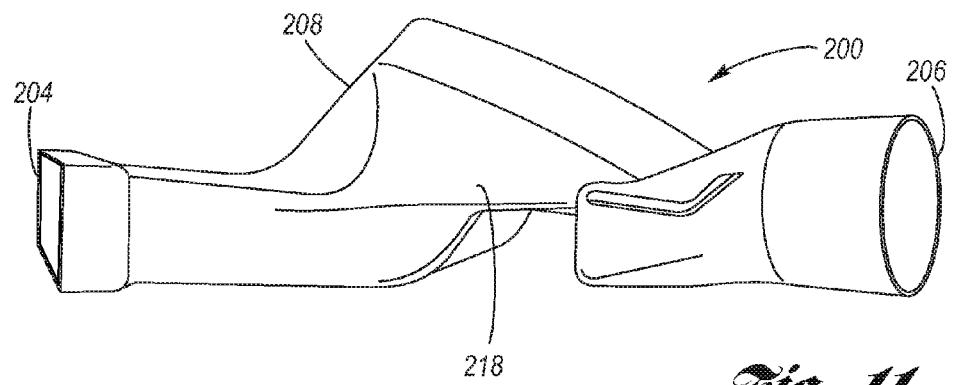
FIG. 11 is a right side elevational view of the divided dual inlet housing according to the present invention.
Figure 12:
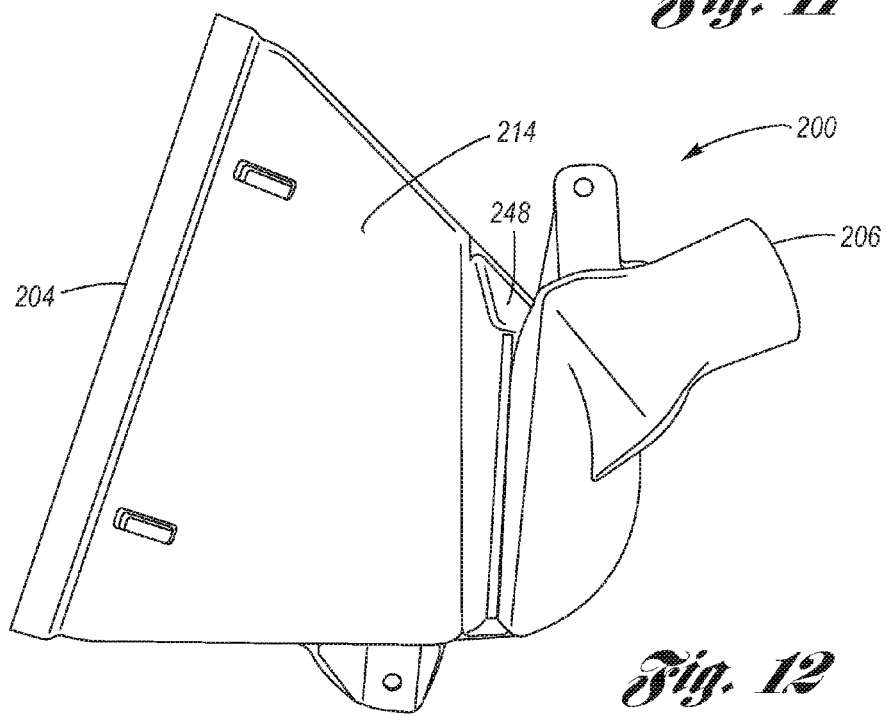
FIG. 12 is a bottom side elevational view of the divided dual inlet housing according to the present invention.
Figure 13:
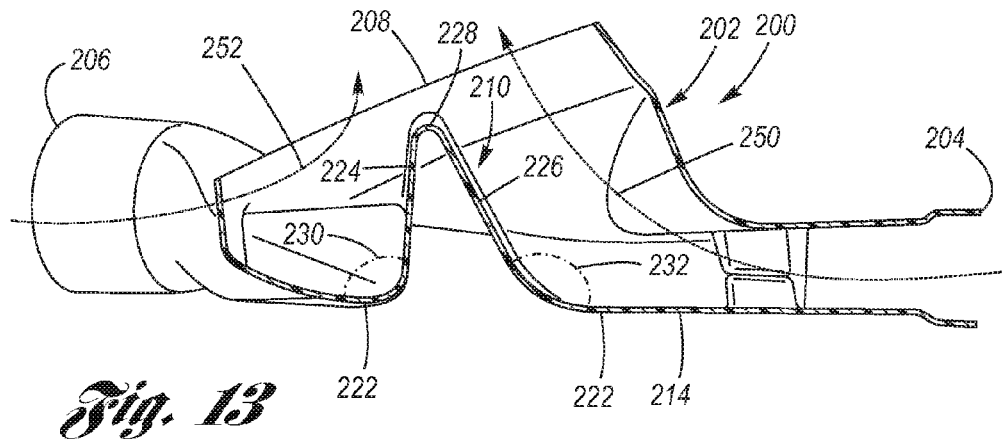
FIG. 13 is a sectional view of the divided dual inlet housing according to the present invention, seen along line 13-13 of FIG. 9.

As can be best understood from simultaneous reference to FIGS. 9 and 13, the dividing wall 210 extends across the internal air chamber 220, extending from the left and right sidewalls 216, 218 of the housing body 202, facilitated by a dimpling 248 of the right sidewall. Preferably, the dividing wall 210 is composed of a first vane 224 facing toward the HVAC air inlet 206 and a second vane 226 facing toward the cabin air inlet, wherein the first and second vanes conjoin at an apex 228 which is preferably convexly shaped. It is further preferred for the first vane 222 to be oriented at a steeper angle relative to the generally flat portions 222 of the lower housing body wall 214 than is that of the second vane 226, preferably the first vane being oriented acutely and the second vane being oriented obtusely. For example as depicted at FIG. 13, a first angle of orientation 230 of the first vane 224 may be about 75 degrees, while a second angle of orientation 232 of the second vane 226 may be about 130 degrees. In this regard, the angle of orientation of the first and second vanes is determined, as for example empirically or by computer modeling, in order to achieve elimination of back flow of HVAC air at the cabin air inlet.

It is to be understood that the dividing wall 210 may be disposed and configured differently from that shown at FIGS. 8 through 13, which is a 50:50 ratio configuration, in which the area of the air outlet 208 is divided about equally, as is the first and second internal air chambers below the air outlet. Referring now to FIGS. 14 through 17, examples of alternative configurations and dispositions of the dividing wall are depicted.

At FIG. 14, which is a view taken similarly to that of FIG. 9, the divided dual inlet housing 2001 now has an alternative preferred dividing wall 2101 which divides the air outlet 2081 and the internal air chamber 2201 therebelow by an 80:20 ratio, wherein the first internal air chamber 2151 has a volume of about 80 percent of the internal air chamber below the air outlet, and the second internal air chamber has a volume of about 20 percent of the internal air chamber below the air outlet.

Figure 15:
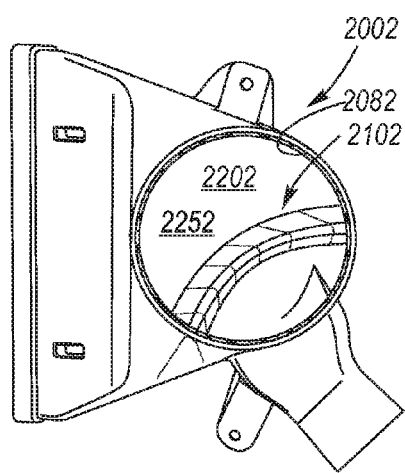
FIG. 15 is a view of the divided dual inlet housing similar to FIG. 14, wherein now the dividing wall rather than dividing the internal air chamber in a straight configuration, now divides the internal air chamber in an arcuate configuration with a substantially 40:60 ratio of division of the internal air chamber.

FIG. 15, which is a view taken similarly to that of FIG. 9, the divided dual inlet housing 2002 now has a dividing wall 2102 which arcuately divides the air outlet 2082 and the internal air chamber 2202 therebelow by a 40:60 ratio, wherein the first internal air chamber 2152 has a volume of about 40 percent of the internal air chamber below the air outlet, and the second internal air chamber has a volume of about 60 percent of the internal air chamber below the air outlet.

Figure 16:
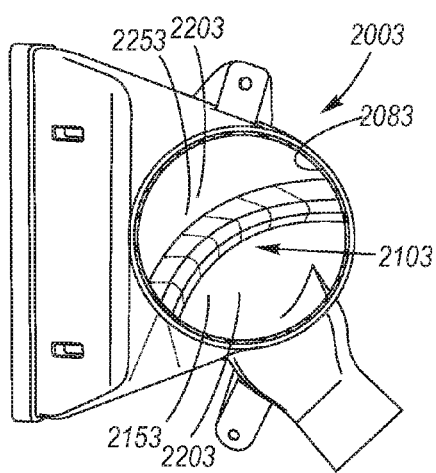
FIG. 16 is a view of the divided dual inlet housing similar to FIG. 15, wherein now the dividing wall divides the internal air chamber in an arcuate configuration with a substantially 50:50 ratio of division of the internal air chamber.

FIG. 16, which is a view taken similarly to that of FIG. 9, the divided dual inlet housing 2003 now has a dividing wall 2103 which arcuately divides the air outlet 2083 and the internal air chamber 2203 therebelow by a 50:50 ratio, wherein the first internal air chamber 2153 has a volume of about 50 percent of the internal air chamber below the air outlet, and the second internal air chamber has a volume also of about 50 percent of the internal air chamber below the air outlet.

Figure 17:
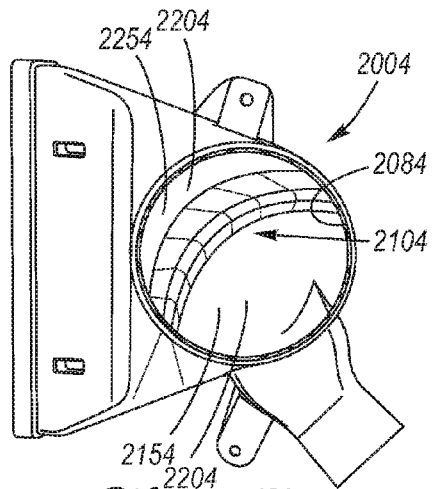
FIG. 17 is a view of the divided dual inlet housing similar to FIG. 16, wherein now the dividing wall divides the internal air chamber in an arc configuration with a substantially 80:20 ratio division of the internal air chamber.

FIG. 17, which is a view taken similarly to that of FIG. 9, the divided dual inlet housing 2004 now has a dividing wall 2104 which arcuately divides the air outlet 2084 and the internal air chamber 2204 therebelow by an 80:20 ratio, wherein the first internal air chamber 2154 has a volume of about 80 percent of the internal air chamber below the air outlet, and the second internal air chamber has a volume of about 20 percent of the internal air chamber below the air outlet.

EXAMPLE I

Figure 18:
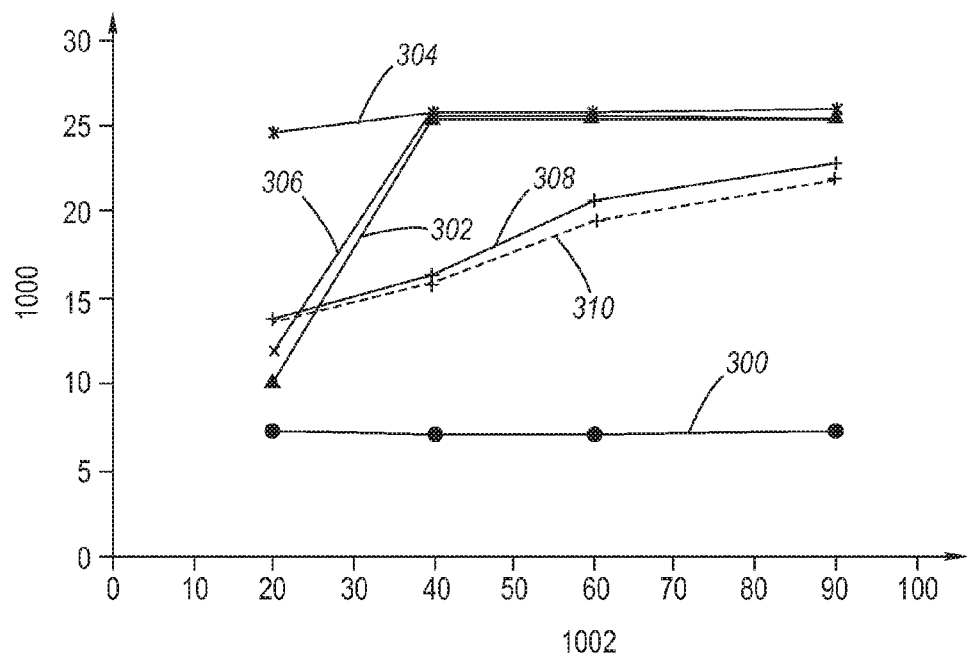
FIG. 18 is a graph of test plots of temperature (1000) versus blower motor percent pulse wave modulation (1002) for a dual inlet housing as generally depicted at FIGS. 5 through 7.

A dual inlet housing similar to that depicted at FIGS. 6 and 7 was tested for air flow in operation simulating the environment depicted at FIG. 5. The test results are depicted at FIG. 18, which is a plurality of air flow plots plotted on a graph of temperature (1000) versus percent pulse wave modulation (1002) of the ESS blower motor 118. Air flow plot 300 is the HVAC air flow exiting the HVAC module before entry into dual inlet housing, being at around 5 degrees C. Air flow plot 302 is the air flow at the left side of the cabin air inlet. Air flow plot 304 is the air flow at the right side of the cabin air inlet. Air flow plot 306 is the air flow at the center of the cabin air inlet. Air flow plot 308 is the air flow at the left side of the HVAC inlet. Air flow plot 310 is the air flow at the right side of the HVAC inlet. It is seen that for percent pulse wave modulation of less than 40, a considerable proportion of the HVAC air is backflowing to the cabin air inlet, causing the temperature of the air flow measured at the cabin air inlet to be lower than cabin air (around 25 degrees C.).

EXAMPLE II

Figure 8:
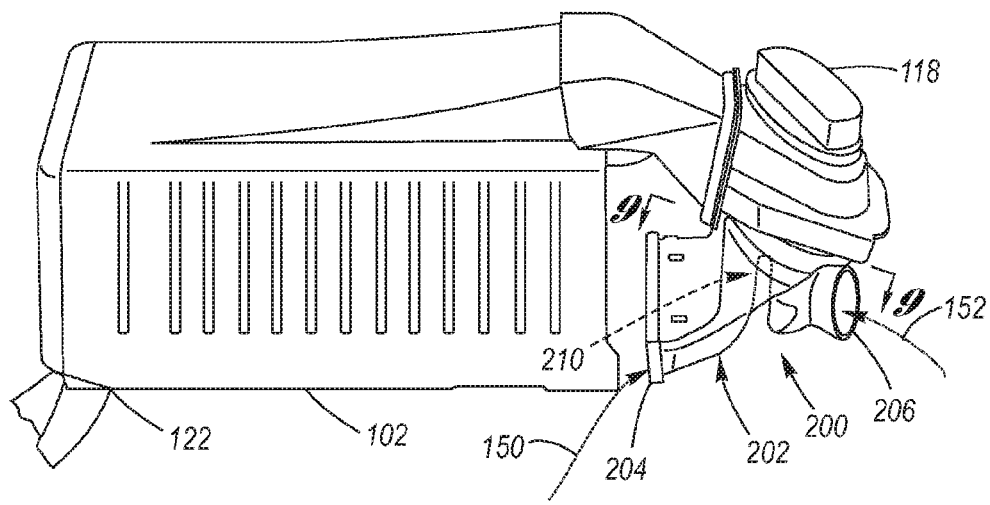
FIG. 8 is an isometric view of components associated with thermal conditioning of a hybrid vehicle ESS including a divided dual inlet housing according to the present invention.
Figure 19:
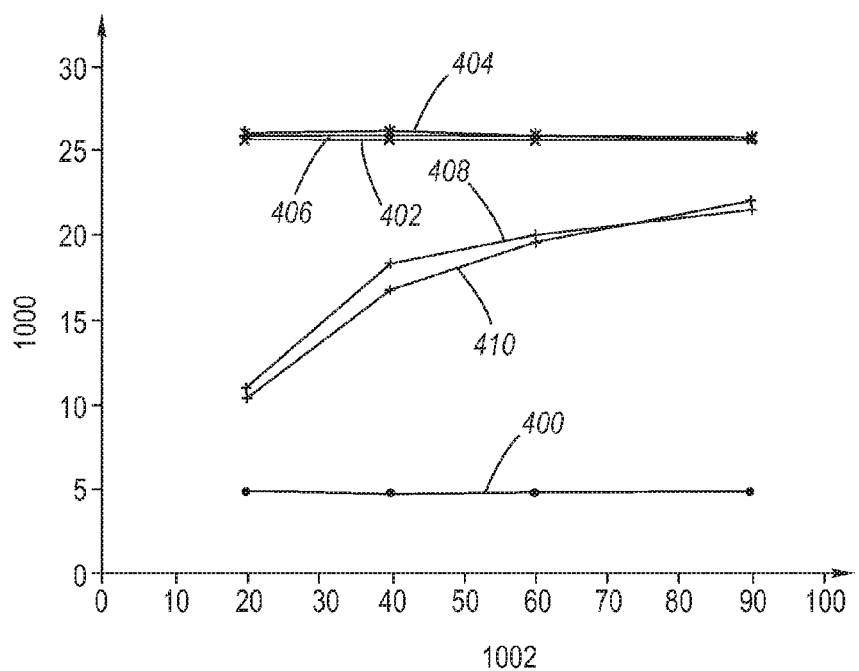
FIG. 19 is a graph of test plots of temperature (1000) versus blower motor percent pulse wave modulation (1002) for a divided dual inlet housing as generally depicted at FIGS. 8 through 13.

A divided dual inlet housing according to the present invention similar to that depicted at FIGS. 9 through 13 was tested for air flow in operation simulating the environment depicted at FIG. 8. The test results are depicted at FIG. 19, which is a plurality of air flow plots plotted on a graph of temperature (1000) versus percent pulse wave modulation (1002) of the ESS blower motor 118. Air flow plot 400 is the HVAC air flow exiting the HVAC module before entry into dual inlet housing, being at around 5 degrees C. Air flow plot 402 is the air flow at the left side of the cabin air inlet. Air flow plot 404 is the air flow at the right side of the cabin air inlet. Air flow plot 406 is the air flow at the center of the cabin air inlet. Air flow plot 408 is the air flow at the left side of the HVAC inlet. Air flow plot 410 is the air flow at the right side of the HVAC inlet. It is seen that for all percent pulse wave modulations, none of the HVAC air is backflowing to the cabin air inlet which remains always at the cabin air temperature (around 25 degrees C.).

EXAMPLE III

Figure 14:
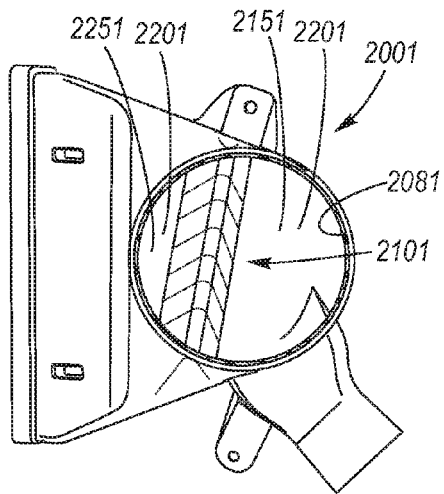
FIG. 14 is a view of the divided dual inlet housing similar to FIG. 9, wherein now the dividing wall rather than dividing the internal air chamber by a 50:50 ratio, now divides the internal air chamber by an 80:20 ratio.
Figure 20:
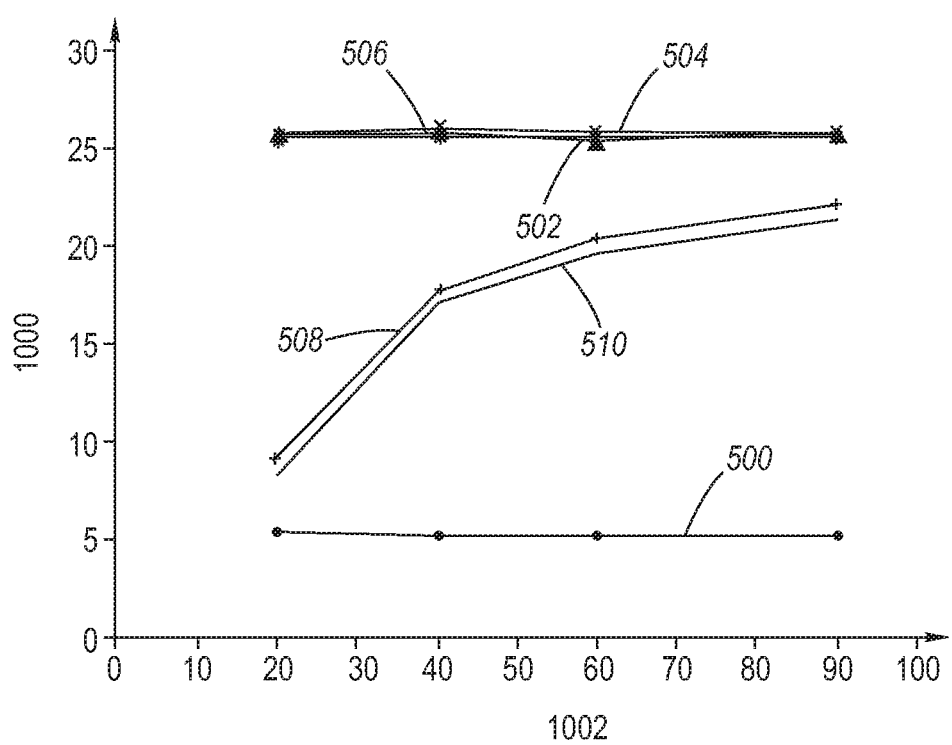
FIG. 20 is a graph of test plots of temperature (1000) versus blower motor percent pulse wave modulation (1002) for a dual inlet housing as generally depicted at FIG. 14.

A divided dual inlet housing according to the present invention similar to that depicted at FIG. 14 was tested for air flow in operation simulating the environment depicted at FIG. 8. The test results are depicted at FIG. 20, which is a plurality of air flow plots plotted on a graph of temperature (1000) versus percent pulse wave modulation (1002) of the ESS blower motor 118. Air flow plot 500 is the HVAC air flow exiting the HVAC module before entry into dual inlet housing, being at around 5 degrees C. Air flow plot 502 is the air flow at the left side of the cabin air inlet. Air flow plot 504 is the air flow at the right side of the cabin air inlet. Air flow plot 506 is the air flow at the center of the cabin air inlet. Air flow plot 508 is the air flow at the left side of the HVAC inlet. Air flow plot 510 is the air flow at the right side of the HVAC inlet. It is seen that for all percent pulse wave modulations, none of the HVAC air is backflowing to the cabin air inlet which remains always at the cabin air temperature (around 25 degrees C.).

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A housing for a thermal conditioning system of a motor vehicle, said housing comprising:
   a housing body comprising a cabin air inlet, a heating cooling and ventilation air inlet, and an air outlet having an outlet area, said housing body further comprising a lower housing body wall; and
   a dividing wall disposed between said cabin air inlet and said heating cooling and ventilation air inlet in dividing relation to said air outlet, said dividing wall comprising:
      a first vane facing toward said heating cooling and ventilation air inlet;
      a second vane facing toward said cabin air inlet; and
      an apex conjoining said first and second vanes;
      wherein said dividing wall is integrally formed of said lower housing body wall as a single piece;
      wherein said apex is spaced from said air outlet; and
      wherein the space between said apex and said air outlet is free of said dividing wall.

2. The housing of claim 1, wherein said first vane is angled acutely with respect to a predetermined portion of said lower housing body wall; and wherein said second vane is angled obtusely with respect to the predetermined portion of said lower housing body wall.

3. The housing of claim 1, wherein said dividing wall is linearly configured across said housing body.

4. The housing of claim 3, wherein said dividing wall divides said outlet area in a ratio of substantially 80 percent to 20 percent, wherein the 80 percent is disposed proximate said heating cooling and ventilation air inlet.

5. The housing of claim 3, wherein said dividing wall divides said outlet area in a ratio of substantially 50 to 50.

6. The housing of claim 1, wherein said dividing wall is arcuately configured across said housing body, wherein said first vane is concavely shaped, and wherein said second vane is convexly shaped.

7. The housing of claim 6, wherein said dividing wall divides said outlet area in a ratio of substantially 80 percent to 20 percent, wherein the 80 percent is disposed proximate said heating cooling and ventilation air inlet.

8. The housing of claim 6, wherein said dividing wall divides said outlet area in a ratio of substantially 50 to 50.

9. In a thermal conditioning system of a motor vehicle comprising an energy storage system, a passenger cabin, a heating, cooling and air conditioning module, an electronic control system and a blower electrically connected with said electronic control system, an improvement thereto comprising a housing connecting cabin air of said passenger cabin with said blower, and connecting heating, cooling and ventilation air from said heating, cooling and ventilation module with said blower, said housing comprising:

a housing body comprising a cabin air inlet, a heating cooling and ventilation air inlet, and an air outlet to said blower, said air outlet having an outlet area, said housing body further comprising a lower housing body wall; and a dividing wall disposed between said cabin air inlet and said heating cooling and ventilation air inlet in dividing relation to said air outlet, said dividing wall comprising:
a first vane facing toward said heating cooling and ventilation air inlet;
a second vane facing toward said cabin air inlet; and
an apex conjoining said first and second vanes;
wherein said dividing wall is integrally formed of said lower housing body wall as a single piece;
wherein said apex is spaced from said air outlet; and
wherein the space between said apex and said air outlet is free of said dividing wall;

wherein when said blower is actuated the heating, cooling and ventilation air encounters said dividing wall and is thereupon directed to said blower such that the heating, cooling and ventilation air does not backflow to said cabin air inlet.

10. The housing of claim 9, wherein said first vane is angled acutely with respect to a predetermined portion of said lower housing body wall; and wherein said second vane is angled obtusely with respect to the predetermined portion of said lower housing body wall.

11. The housing of claim 9, wherein said dividing wall is linearly configured across said housing body.

12. The housing of claim 11, wherein said dividing wall divides said outlet area in a ratio of substantially 80 percent to 20 percent, wherein the 80 percent is disposed proximate said heating cooling and ventilation air inlet.

13. The housing of claim 11, wherein said dividing wall divides said outlet area in a ratio of substantially 50 to 50.

14. The housing of claim 9, wherein said dividing wall is arcuately configured across said housing body, wherein said first vane is concavely shaped, and wherein said second vane is convexly shaped.

15. The housing of claim 14, wherein said dividing wall divides said outlet area in a ratio of substantially 80 percent to 20 percent, wherein the 80 percent is disposed proximate said heating cooling and ventilation air inlet.

16. The housing of claim 14, wherein said dividing wall divides said outlet area in a ratio of substantially 50 to 50.

* * * * *